United States Patent [19]

Glumac

[11] 4,050,707

[45] Sept. 27, 1977

[54] LIFTABLE BED TRUCK BODY CONFIGURATION FOR REMOVABLE STORAGE UNIT

[75] Inventor: Nick P. Glumac, Chesterton, Ind.

[73] Assignee: Toter-Tee, Inc., Chesterton, Ind.

[21] Appl. No.: 622,104

[22] Filed: Oct. 14, 1975

[51] Int. Cl.² .................... B62D 21/18; B62D 53/08
[52] U.S. Cl. ............................ 280/43.23; 108/51.1; 214/515; 280/438 R
[58] Field of Search ............. 214/512, 514, 515, 621; 254/49; 280/43.12, 43.13, 43.23, 43.17, 43.2, 438 R; 108/51 R, 52

[56] References Cited

U.S. PATENT DOCUMENTS

| | | |
|---|---|---|
| 2,126,278 | 8/1938 | Quayle .............................. 108/51 R |
| 2,475,443 | 7/1949 | Bill ............................... 280/43.23 X |
| 2,480,909 | 9/1949 | Davis ............................ 280/43.23 X |
| 3,145,865 | 8/1964 | Rogers .................................. 214/512 |
| 3,330,574 | 7/1967 | Kulyk ........................... 280/438 R X |
| 3,655,214 | 4/1972 | Lane ................................... 280/43.23 |
| 3,724,697 | 4/1973 | Arvidsson ...................... 214/512 X |
| 3,737,061 | 6/1973 | Glumac ................................ 214/512 |

Primary Examiner—Robert G. Sheridan

[57] ABSTRACT

A truck trailer having a fixed bed and a liftable bed superposed above said liftable bed wherein the lifting means comprises an hydraulic actuator and the like for lifting rearward portions of the liftable bed and wherein the lifting means for the forward portion of the liftable bed comprises a variable height hitching mechanism adapted to be connected to the "fifth wheel" hitching plate carried by a truck tractor.

2 Claims, 10 Drawing Figures

LIFTABLE BED TRUCK BODY CONFIGURATION FOR REMOVABLE STORAGE UNIT

BACKGROUND OF THE INVENTION

This invention is an improvement on my previously issued U.S. Pat. No. 3,737,061.

It has been proposed heretofore to provide tractor bodies with liftable bed features in combination with removable storage units to be carried thereon. The truck trailer is maneuvered into position beneath the storage unit, the bed is raised for transport of the unit and the unit is removed by lowering the bed at the delivery destination. Examples of such arrangements may be seen in U.S. Pat. No. 2,596,838; 2,670,866; 2,676,783; 3,362,552 and the above-mentioned U.S. Pat. No. 3,737,061.

In each of the several liftable truck bed systems described in these listed patents, the liftable bed is raised vertically by an independent actuator system comprising one or more actuators which operate directly upon the liftable bed, or through linkages to raise the entire bed the requisite height for travel above the fixed bed. As stated in U.S. Pat. No. 2,676,783, such actuation must be critically designed in order to prevent jamming and the severe stresses of over balance, over hanging and deflection of the supplemental (liftable) bed.

It is the objective of the present invention to disclose an improved, simplified technique and apparatus for a liftable truck trailer which will accommodate light to extremely heavy loads with great reliability.

SUMMARY OF THE INVENTION

In accordance with the present invention, novel, simplified and extremely reliable means are disclosed for raising the load bearing portions of a trailer body after said body has been maneuvered beneath a load bearing storage unit, the raising of the trailer body being required to lift the load bearing unit into transport position. The lifting means at the forward end of the trailer body comprises a variable-height hitching mechanism where the trailer is attached to the so-called "fifth wheel" or circular mounting plate upon the truck tractor. At the rearward end, the trailer body is provided with a fixed bed to which the rearwardly positioned trailer wheels are attached, said bed being generally coextensive with the rear wheels and underlying the rearward portion of the trailer load bearing surface, the latter being able to be raised to the fixed bed by one or more fluid actuators operating between the fixed and liftable beds. In order to secure the load bearing surface in its raised position, locking means are provided in conjunction with the forward variable-height hitching mechanism and at the rearward end, laterally movable beams are provided having the same height as the elevated distance of the hitching mechanism in its extended position, plus the amount initially necessary for the hitching mechanism to sit upon the "fifth wheel," said beams being slidable along the fixed bed beneath the rearward liftable portions of the load bearing bed to assure solid support between the fixed and liftable bed sections.

Further aspects of the invention will be seen with reference to the following specification and the drawing.

DESCRIPTION OF A PARTICULAR EMBODIMENT

Figure 1:
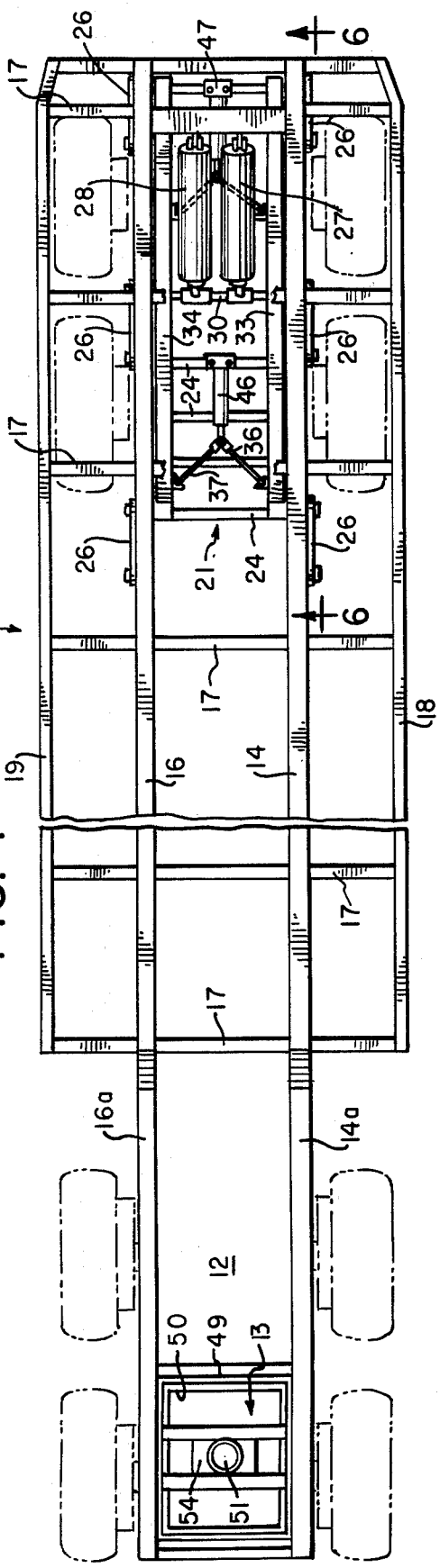
FIGS. 1 and 2 are respectively plan and side views of a trailer body constructed according to the principles of the present invention.
Figure 2:
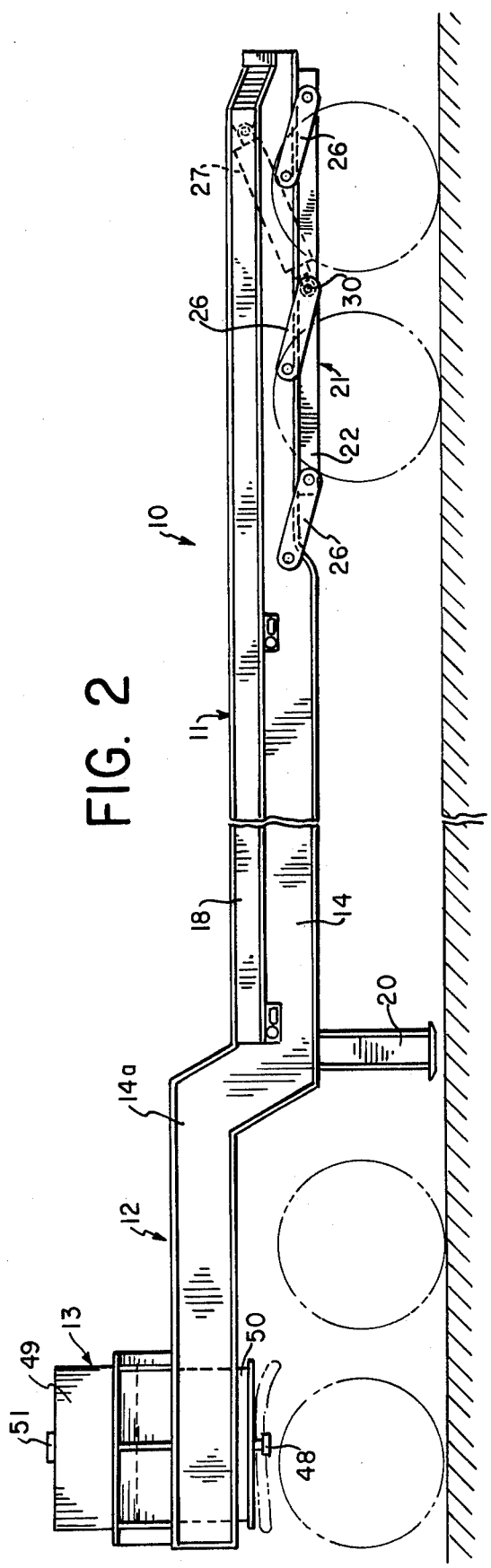

Referring now to the drawing and initially to FIGS. 1 and 2 thereof, a truck trailer 10 constructed according to the principles of the present invention has been illustrated. The trailer 10 comprises a load bearing section 11 and has a forward section 12 adapted to be secured to a truck tractor whose wheels have been illustrated in phantom lines. Also illustrated in phantom outline is the "fifth wheel" or circular plate mounted upon the tractor to which the trailer 10 is secured for transport after actuation of the mechanism 13 to be described.

The load bearing section 11 includes two lengthwise beams or girders 14 and 16 and a series of transverse interconnecting beams 17. Forward section 12 is formed by a raised jogged portions 14a and 16a of beams 14 and 16 which straddle and support hitching mechanism 13. Two outer longitudinal beams 18 and 19 define the lateral edges of the load bearing section 11 and are connected to and supported by the transverse beams 17. Pedestal 20 extends downwardly from beams 14 and 16 adjacent to portions 14a, 16a thereof for support of the forward end of trailer 10 when it is not connected to a truck tractor.

Figure 6:
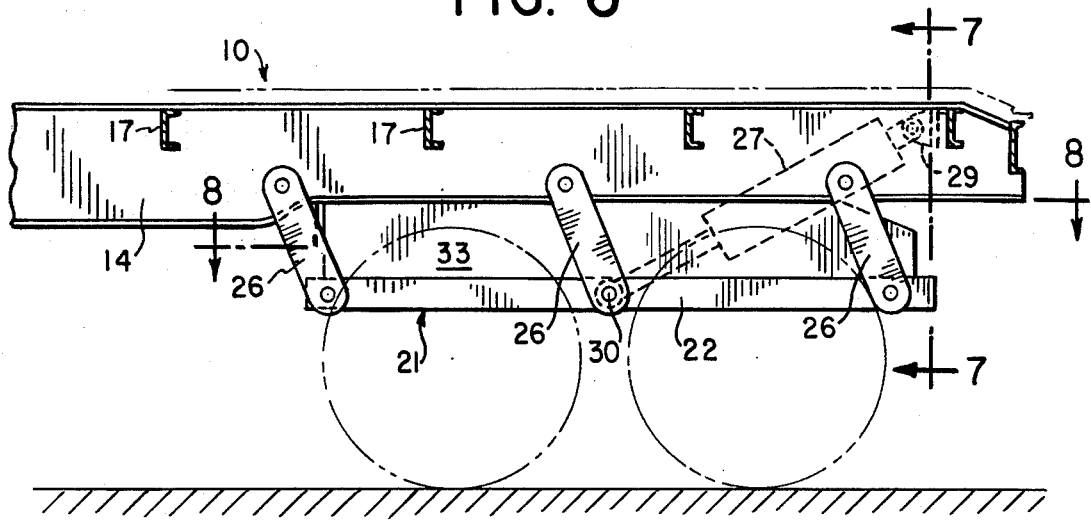
FIG. 6 is a cross-section taken in the direction of arrows 6—6 of FIG. 1.
Figure 7:
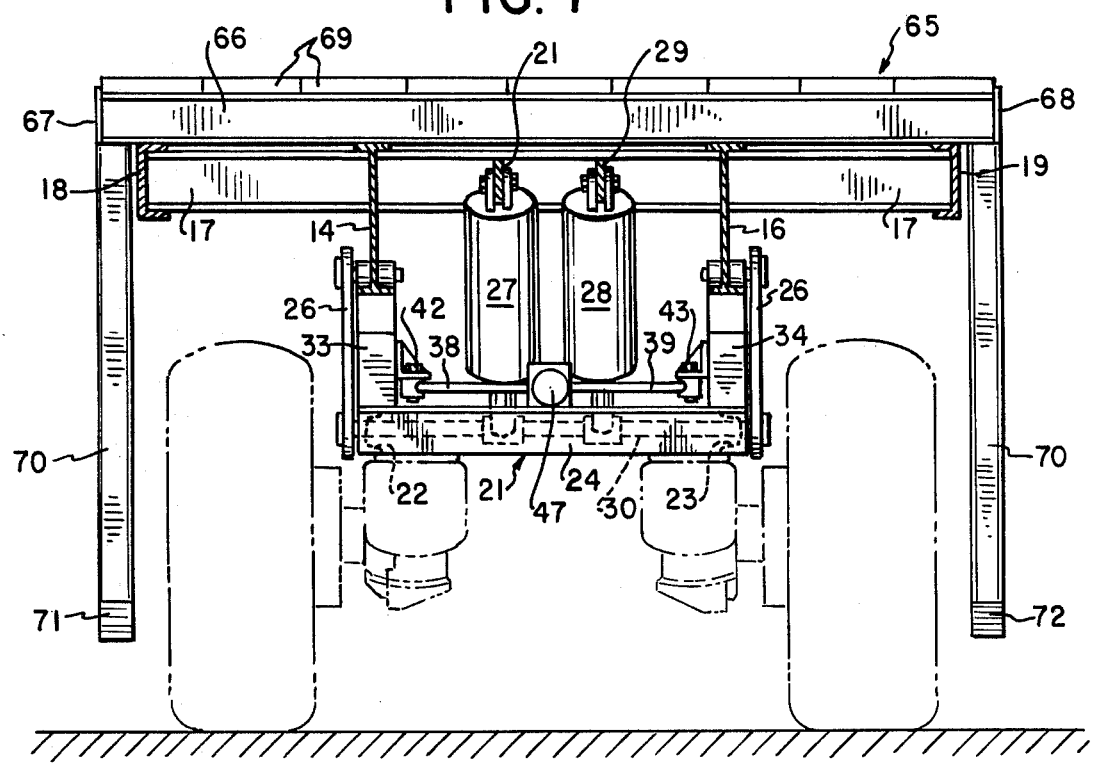
FIG. 7 is a cross-section taken in the direction of arrows 7—7 of FIG. 6.

In accordance with the present invention, a fixed bed 21 consisting of two longitudinal beams 22 and 23 and transverse beams 24 extend above the doubled ganged rear wheels of the trailer 10 and are connected thereto in the conventional manner by the phantom line suspension mechanism illustrated in FIG. 7. Fixed bed 21 is connected to the load bearing bed 11 by guide links 26 pivotally attached to beams 22, 23 and to main longitudinal beams 14 and 16. As best seen in FIGS. 6 and 7, vertical lifting ram means in the form of hydraulic actuators 27, 28 extend between beds 11 and 21, the body of each actuator being secured at its upper ends to brackets 29 attached to transverse beams 17 and at the lower ends, actuating rods or rams 27a, 28a are yoked to rod 30 which is secured through beams 22 and 23. Accordingly, simultaneous actuation of actuators 27, 28 by admission of hydraulic pressure cause extention of rods 27a, 28a and the lifting of bed 11 with respect to the fixed bed 21 and the trailer wheels mounted thereto. It should be noted that although two actuators 27 and 28 have been shown in the embodiment, the present design permits the use of only one actuator for light loads, or of more than two actuators for extremely heavy loads of say up to 100 tons. In other words, it is contemplated that the number of actuators will vary and actuators can readily be installed or removed to increase or decrease load bearing capability. It will be further noted from FIGS. 2 and 6 that actuators 27 and 28 are disposed at an angle with respect to fixed bed 21. It has been found that the closer actuators 27, 28 approach the vertical, the better and more efficient is the lifting action.

Figure 8:
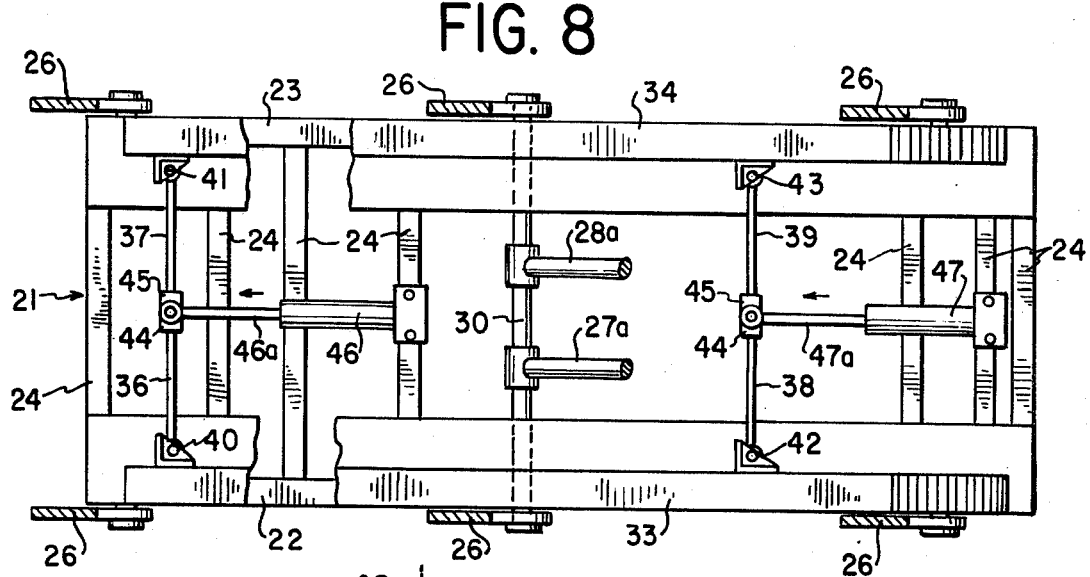
FIG. 8 is a cross-section taken in the direction of arrows 8—8 of FIG. 6.

In my U.S. Pat. No. 3,737,061, a novel mechanism to be interposed between fixed and liftable truck beds has been disclosed which provides great intermediate support for the liftable bed in its raised or transport position. It is proposed herein to incorporate a similar supporting mechanism between beds 11 and 21. As best seen in FIGS. 7 and 8, resting upon bed 21 and slidably movable in laterally opposed directions thereupon are two, longitudinal box beams 33, 34 (which may be of rectangular cross-section or in other structural variations such as I-beams, H-beams, channel, etc.). Beams 33 and 34 are connected at forward and rearward positions to arms 36–39 by pivots 40 –43. Arms 36–39 each are centrally connected to yokes 44 and 45 attached to rods 46a and 47a of hydraulic actuators 46 and 47. The latter may be simultaneously actuated to extend arms 36–39 (FIG. 8) to slide beams 33 and 34 laterally beneath beams 14 and 16 subsequent to these members having been lifted to the position of FIG. 7. Thereupon, actuators 27 and 28 may be deenergized permitting beams 14 and 16 to come down upon beams 33 and 34 now solidly interposed between beds 11 and 21 for transport of a load placed upon bed 11.

Figure 9:
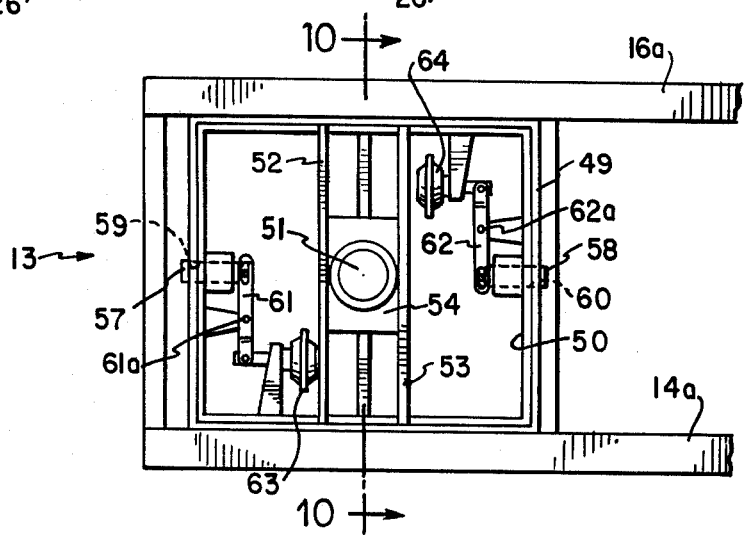
FIG. 9 is a plan view of the forward end of the trailer body of FIG. 1 of the variable-height hitching mechanism thereof.
Figure 10:
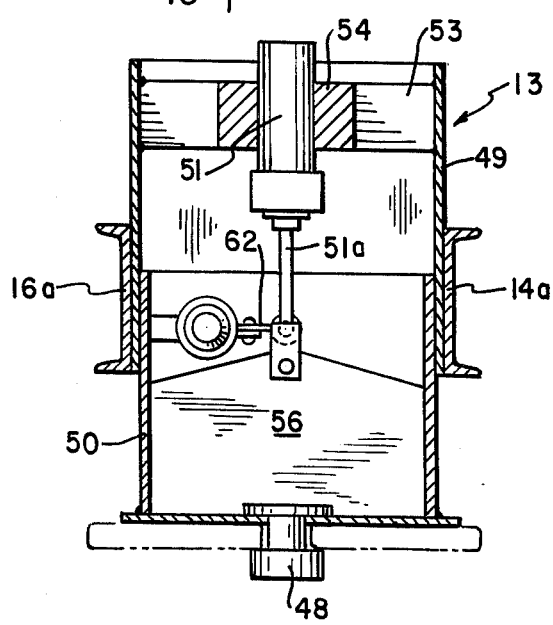
FIG. 10 is a cross-section taken in the direction of arrows 10—10 of FIG. 9.

Reference is now made to the hitching mechanism 13 and more particularly to FIGS. 2, 9 and 10. Foot 48 is adapted to fit and be locked into the "fifth wheel" mounted upon the truck tractor, which permits relative pivotal movements between trailer and tractor bodies. One function of the adjustable height feature to be described is to permit mechanism 13 to accommodate variations in height of the "fifth wheel" which generally will be at 46 to 54 inches from ground. Therefore, the bottom surface of mechanism 13 will be set at about 56 inches usually (without extension of the variable-height mechanism) and initial actuation of the mechanism will cause plate 13a to sit down upon the "fifth wheel". Mechanism 13 comprises an outer oblong shell 49 rigidly attached to and mounted between the jogged portions 14a and 16a of beams 14 and 16, and an inner telescoping shell 50. A vertical ram or hydraulic actuator 51 is rigidly secured to outer shell 49 through the agency of steel plates 52, 53 and mounting block 54, all parts being securely bolted, riveted or welded together. Actuator 51 is connected at its lower end through rod 51a to steel plate 56 which is welded internally to the inner shell 50. Accordingly, energization of actuator 51 will raise shell 49 and will lift the forward end of trailer 10 relative to the "fifth wheel" connection. When in the raised position, pins 57 and 58 may be moved into a set of aligned apertures 59 and 60 (sets of different heights being provided) in inner and outer shells 49 and 50 to lock these members in various extended positions for transport. Pins 57 and 58 are each connected to cranks 61 and 62 which can be rotated about pivots 61a, 62a by actuators 63, 64 to extend or withdraw pins 57 and 58. When extended, the amount of extension dimensionally of shell 50 from outer shell 49 will be approximately the height of beams 33 and 34, plus the vertical height variation necessary to adjust for different heights of the "fifth wheel".

Figure 3:
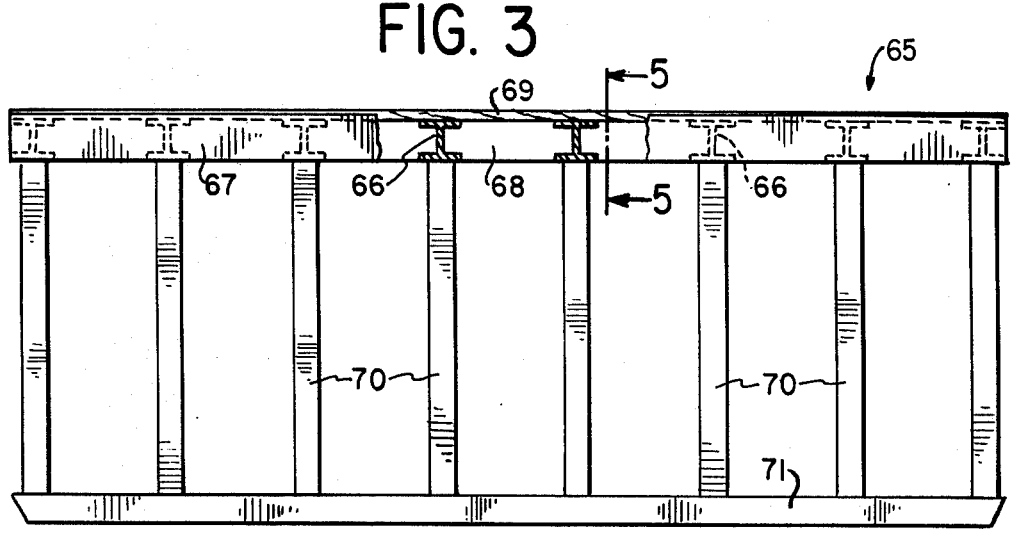
FIG. 3 is a side view of a load bearing pallet suitable to be carried by the trailer body of FIGS. 1 and 2.
Figure 4:
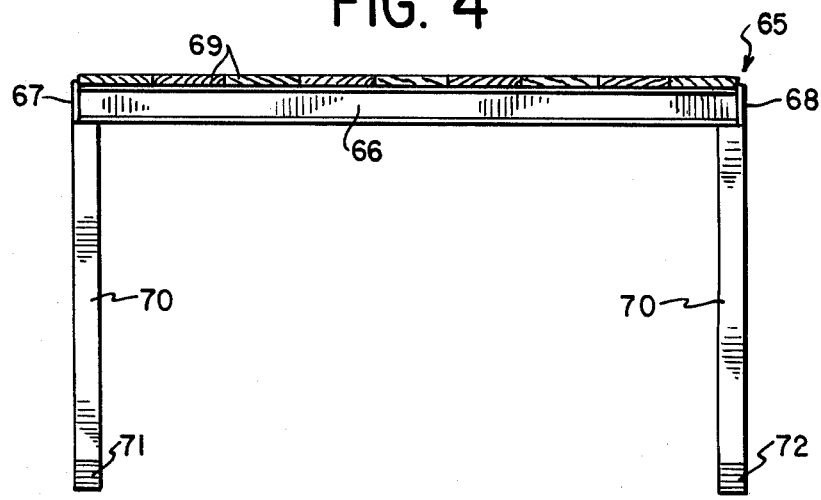
FIG. 4 is an end view of the pallet of FIG. 3.
Figure 5:
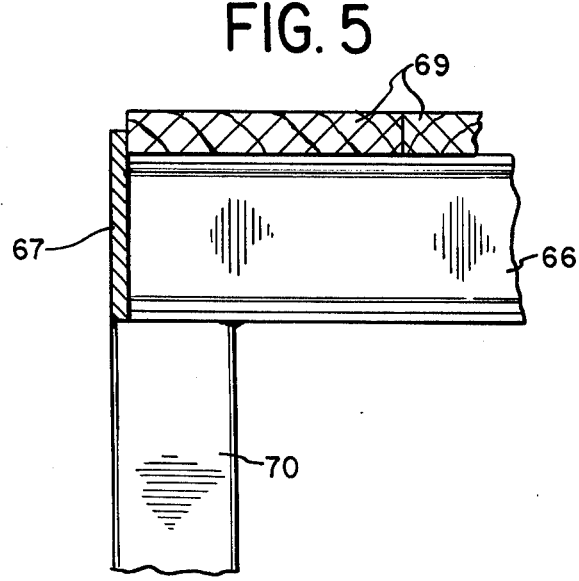
FIG. 5 is a cross-section taken in the direction of arrows 5—5 of FIG. 3.

Referring to FIGS. 3–5, a load bearing unit or pallet 65 of the type which may be transported by trailer 10 has been illustrated. Pallet 65 comprises a plurality of transverse beams 66 which are secured together along their outer edges by being welded to heavy steel plates 67 and 68. Plates 67 and 68 extend slightly above beams 66 to retain a plurality of wooden planks 69 which support the load. Welded directly beneath each cross beam 66 are oblong legs 70 which are welded at their lower edges to runners 71 and 72. This construction is very stable and strong and minimizes flexing of the legs relative to the superstructure.

As seen in FIG. 7, pallet 65 is in the raised or transport position. In order to place the pallet in this position, the trailer will be maneuvered beneath the pallet while bed 11 is resting directly upon bed 21 at the rearward end and while the mechanism 13 is in its retracted position (FIGS. 1 and 2). Then by preferably simultaneous energization of actuator 51 at the forward end of trailer 10 and of actuators 27 and 28 at the rearward end, the bed 11 may be raised evenly to engage the pallet 65 and then to lift the pallet (and its load, not shown) into a slightly higher position as shown in phantom lines in FIG. 6. Upon energization of actuators 46 and 47, beams 33 and 34 are laterally interposed between bed 21 and beams 14 and 16 which may rest solidly thereupon for transport upon deenergization of actuators 27 and 28, as shown in FIG. 7. Likewise, pins 57 and 58 will be hydraulically actuated to lock forward lift mechanism 13 in its extended position which dimensionally matches in a vertical direction beams 33 and 34 to provide an exactly level support system for transport of pallet 65. Unloading sequence is the reverse of that described.

In accordance with the present invention therefor, a unique, simplified and highly effective arrangement has been disclosed for raising and securing in raised position, load bearing sections of a trailer body for transport beneath removable load bearing units such as a pallet 65. By utilizing the variable-height hitching mechanism 13, only the very rearward portions of the load bearing bed 11 need be raised above the fixed bed 21, and the latter need only be constructed to be coextensive generally with the rearward portions of the beams of the trailer body. Consequently, the mechanism for lifting is greatly simplified and the stresses created by large loads upon a raised platform are greatly minimized. Furthermore, since loads may be generally distributed somewhat closer to the trailer wheels than to the forward hitching mechanism, such loads may be more readily handled by varying the size and number of the actuators needed to raise the rearward portion of the bed 11 with respect to the fixed bed 21, although extremely heavy loads may require doubling-up of actuator capacity in the variable-height actuation mechanism. Also, less stress and strain results from the combination of well-distributed, upward force laterally under the rearward portion of bed 11 and the unitary or point force with respect to the hitching mechanism.

It will be understood that the above specification relates to a particular embodiment and is merely representative. In order to appreciate the scope of the invention, reference should be made to the claims.

I claim:

1. A variable height truck trailer adapted to be connected to and drawn by a truck tractor comprising a fixed bed and a liftable, load bearing bed in superposed relation to said fixed bed, means mounted between said beds adjacent to the rearward end thereof for elevating said liftable bed a predetermined distance above said fixed bed, a "fifth wheel" hitching mechanism at the forward end of said liftable bed, said hitching mechanism being adapted to be supported upon and attached to a generally circular and horizontally positioned "fifth wheel" mounting plate attached to said tractor body, said hitching mechanism including means extendible vertically between said plate and said liftable bed for initially matching the height of said "fifth wheel" for attachment of said hitching mechanism thereto and then for elevating the forward end of said liftable bed at the same time and to the same vertical extent as the rearward portion of the liftable bed is raised by the elevating means between the fixed and liftable beds, said vertically extendible means including inner and outer vertically telescoping extensible shells, one of which is connected to said "fifth wheel" plate and the other to said liftable bed, fluid actuation means to move said shells relative to each other, apertures defined respectively in the walls of said extensible shells adapted to be aligned horizontally when the forward end of said liftable bed is level with said rearward portion and the latter is resting upon said fixed bed and when the liftable bed is secured for the transport of loads in an elevated position above said fixed bed, a plurality of horizontally movable pins for insertion in said apertures when said apertures are in aligned relation to secure said shells in a predetermined vertically extended position, and means for actuating said pins when said apertures have come into aligned relation at a predetermined height position.

2. The truck trailer body according to claim 1 in which said liftable bed includes two lengthwise longitudinal beams, one of the inner and outer vertically telescoping extensible shells being secured to and between the forward ends of said longitudinal beams, the means for elevating said liftable bed relative to said fixed bed comprises at least one fluid actuator, the means for securing the rearward end of the liftable bed in elevated position comprises two movable beams slidable upon said fixed bed laterally between said fixed bed and said liftable bed, said liftable bed resting upon said beams during the transport of loads upon said liftable bed, said apertures are arranged at different vertical levels, one of which levels corresponds to the height of the liftable bed above the fixed bed when the liftable bed is resting upon said movable beams in order to secure the liftable bed in a relatively horizontal level position during the transport of loads upon said liftable bed.

* * * * *